United States Patent
Ew

(10) Patent No.: US 9,619,610 B1
(45) Date of Patent: Apr. 11, 2017

(54) CONTROL BLOCK SIZE REDUCTION THROUGH IP MIGRATION IN AN INTEGRATED CIRCUIT DEVICE

(71) Applicant: Altera Corporation, San Jose, CA (US)

(72) Inventor: Chee Yong Ew, Bayan Lepas (MY)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/872,989

(22) Filed: Oct. 1, 2015

(51) Int. Cl.
*G06F 17/50* (2006.01)

(52) U.S. Cl.
CPC .............................. *G06F 17/5081* (2013.01)

(58) Field of Classification Search
CPC . G06F 17/5022; G06F 17/5027; G06F 17/505
USPC .................................................. 716/101, 102
See application file for complete search history.

(56) References Cited

U.S. PATENT DOCUMENTS

| | | | | |
|---|---|---|---|---|
| 6,976,160 B1 * | 12/2005 | Yin et al. | ................... | G06F 1/24 326/38 |
| 7,058,921 B1 | 6/2006 | Hwang et al. | | |
| 7,183,799 B1 * | 2/2007 | Donlin | ................... | H03K 19/173 257/E27.105 |
| 7,240,303 B1 * | 7/2007 | Schubert et al. | | G01R 31/31705 703/13 |
| 7,734,934 B2 | 6/2010 | Zimmer et al. | | |
| 7,904,564 B2 | 3/2011 | Pafumi | | |
| 8,079,009 B1 * | 12/2011 | Sinclair | ................... | G06F 17/505 716/101 |
| 8,427,198 B1 * | 4/2013 | Cheruku | ............. | H04L 25/0278 326/30 |
| 2006/0152248 A1 | 7/2006 | Madurawe | | |
| 2006/0153188 A1 | 7/2006 | Doi et al. | | |

(Continued)

FOREIGN PATENT DOCUMENTS

EP     2894572     7/2015

OTHER PUBLICATIONS

Fritzell, Anders Hauk, "A System for Fast Dynamic Partial Reconfiguration using GoAhead Design and Implementation Master thesis", Aug. 12, 2013, XP055339435, Retrieved from the Internet: URL: https://www.duo.uio.no/bitstream/handle/10852/37693/fritzell-master.pdf?sequence=1&isAllowed=y, [retrieved on Jan. 27, 2017].

(Continued)

*Primary Examiner* — Sun Lin

(57) ABSTRACT

Methods for control block size reduction of a controller of an integrated circuit (IC) device through intellectual property (IP) migration in the IC device are disclosed. A disclosed method includes receiving configuration data for the IC device and determining whether IP construction data is defined in the configuration data. The IP construction data contains instruction sets for implementing logical operations of a controller-based IP core in a core region of the IC device. Such data creates flexibility to configure the controller-based IP core in a core logic circuit as a soft IP core, when required. In this scenario, the controller-based IP core can be removed from the controller of the IC device during IC device fabrication. As a result, the footprint (e.g., area) of the controller of the IC device can be reduced, which subsequently increases cost-savings for the IC device fabrication.

20 Claims, 6 Drawing Sheets

(56) References Cited

U.S. PATENT DOCUMENTS

2007/0103192 A1    5/2007  Madurawe
2007/0147604 A1*   6/2007  Salgunan .............. H04L 9/0631
                                                          380/28

OTHER PUBLICATIONS

Dirk Koch et al., "Bitstream Decompression for High Speed FPGA Configuration from Slow Memories", Field-Programmable Technology, 2007, ICFPT 2007, International Conference on, IEEE, PI, Dec. 1, 2007, pp. 161-168, XP031208386, ISBN: 978-1-4244-1471-0.
Curd, Derek, "PCI Express for the 7 Series FPGAs", Sep. 21, 2012. XP055339927, Retrieved from the internet: URL:http://www.xilinx.com/support/documentation/white_papers/wp384_PCIe_7series.pdf [retrieved on Jan. 27, 2017].
Anonymous, "Vivado Design Suite User Guide", Oct. 2, 2013, XP055339939, Retrieved from the Internet: URL: http://citeseerz.ist.psu.edu/viewdoc/download;jsessionid=D1A666477D86BC84A9DA299BD1CAAFD2?DOi=10.1.1.406.5822&rep=rep1&type=pdf [retrieved on Jan. 27, 2017].

* cited by examiner

CONTROL BLOCK SIZE REDUCTION THROUGH IP MIGRATION IN AN INTEGRATED CIRCUIT DEVICE

BACKGROUND

A programmable logic device (PLD), such as a Field Programmable Gate Array (FPGA), is an integrated circuit (IC) that is programmed to perform specified logic functions. The PLD typically includes an array of programmable logic blocks that are programmed with an intellectual property (IP) core. It is appreciated that the IP core is typically proprietary configuration data used for performing a variety of commonly-used functions. The IP core can be vendor-provided and sold either by a manufacturer of the PLD or by a third party, freeing a customer of the manufacturer from needing to program the functions on their own.

Generally, an IP core includes a predetermined set of configuration data bits that program the PLD to perform one or more functions. Logic and connectivity of a design in the PLD can be represented by or be mapped by the IP core. The IP core can provide Digital Signal Processing (DSP) functions, storage function, logic functions, and math functions.

The PLD is typically configured using a dedicated controller (sometimes referred to as a "control block" or "control circuit"). In conventional controller architecture, the IP cores are typically built together in a single block along with other configuration logic. Due to the requirement of the IP cores and the other configuration logic to support various device features, the controller can take up a significant amount of device area in an IC device.

When the IC device is initialized during power up, there are times when some or all of these IP cores are not used or required by the controller. In this case, the unused IP cores still permanently exist in the controller even when the IP cores are disabled from operation. Such a configuration leads to an unnecessary increase of the device area, which subsequently results in an increase in device fabrication cost.

SUMMARY

In accordance with the present invention, methods are provided for reducing control block size through intellectual property (IP) migration in an integrated circuit (IC) device.

It is appreciated that the present invention can be implemented in numerous ways, such as a process, an apparatus, a system, or a device. Several inventive embodiments of the present invention are described below.

A method of using a logic design system to create configuration data for an IC device is provided. The method includes receiving custom logic design data for the IC device, and analyzing requirements of a controller for the IC device that is formed using the custom logic design circuit. An intellectual property (IP) core associated with the controller is then identified. The method further includes receiving an input selection corresponding to the identified IP core, whereby the input selection activates a soft IP configuration state for the IP core. In response to the activation of the soft IP configuration state, the logic design system generates the configuration data for the IC device. The configuration data includes soft IP configuration data for configuring an associated soft IP core of the IP core in a core region of the IC device to implement logic functions of the IP core. Accordingly, a flag signal associated with the soft IP configuration data is generated along with the configuration data. The flag signal enables the soft IP configuration data to be configured in the core region of the IC device during the initial configuration operation of the IC device. In the case when an additional IP core is identified and selected, an updated configuration data is generated for the IC device. The updated configuration data may include additional soft IP configuration data that configures an additional associate soft IP core of the selected additional IP core in the core region of the IC device.

A method of for using logic design system to configure an IC device having a core region and a control region using custom logic design data during device power-up is provided. The method includes identifying that the custom logic design data includes a controller-based intellectual property (IP) element for the core region of the IC device. Accordingly, the method further includes generating configuration data for the IC device using the controller-based IP element and the custom logic design data. The generated configuration data may identify a location in the core region of the IC device at which the IC device is to be configured using the controller-based IP element.

A method of configuring an IC device having a core logic circuit and a control circuit that is separate from the core logic circuit is provided. The method includes receiving configuration data at computer equipment and determining whether IP construction data is defined in the configuration data, where the IP construction data is associated with a controller-based intellectual property (IP) element for the control circuit of the IC device. If the IP configuration data is defined in the configuration data, the core logic circuit of the IC device will be configured using the controller-based IP element.

Further features of the invention, its nature and various advantages, will be more apparent from the accompanying drawings and the following detailed description of the preferred embodiments.

DETAILED DESCRIPTION

The embodiments described herein include integrated circuit structures and methods for reducing control block size through intellectual property (IP) migration in an integrated circuit (IC) device.

It will be obvious, however, to one skilled in the art, that the present exemplary embodiments may be practiced without some or all of these specific details. In other instances, well-known operations have not been described in detail in order not to obscure unnecessarily the present embodiments.

Figure 1:
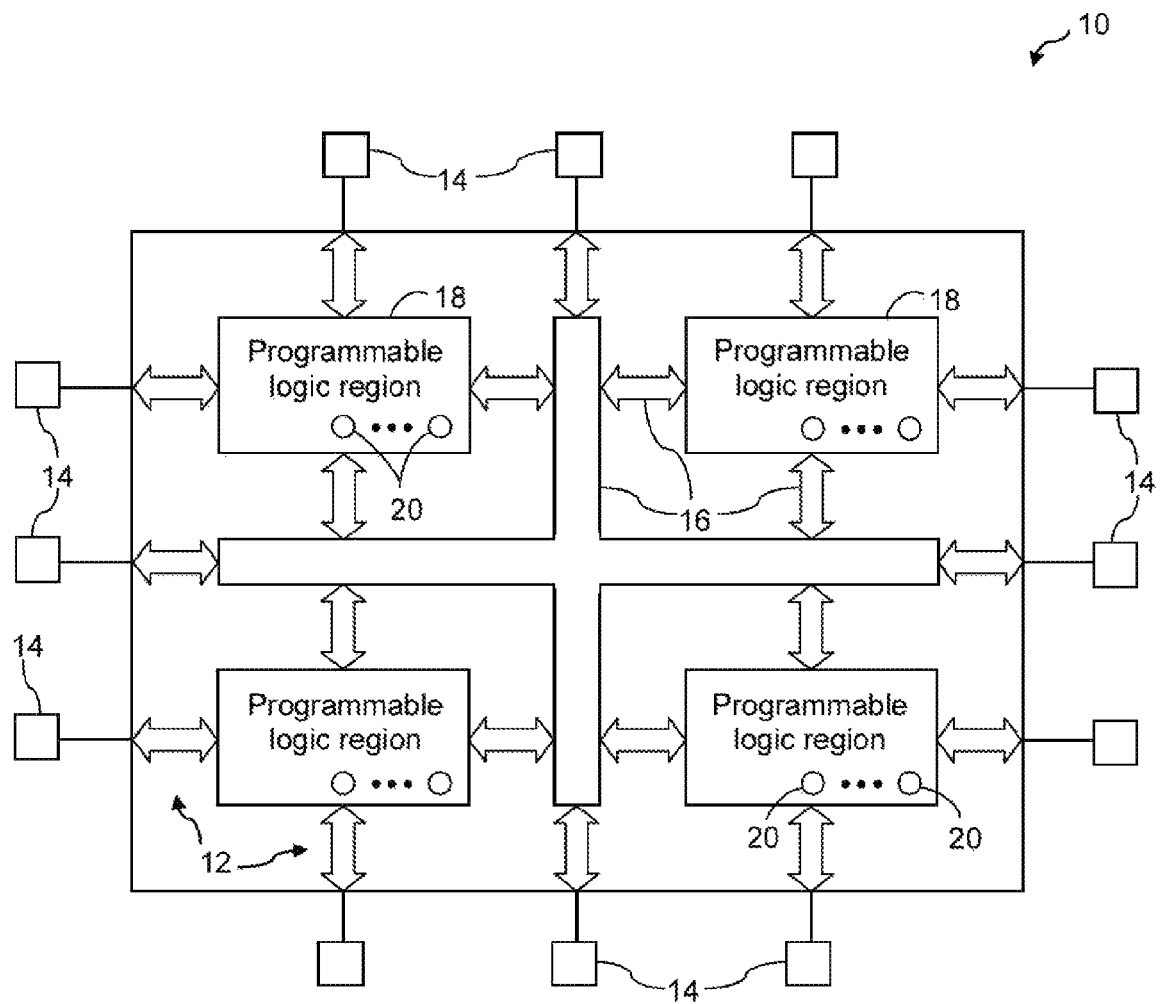
FIG. 1 is a diagram of an illustrative integrated circuit in accordance with an embodiment of the present invention.

FIG. 1 is a diagram of an illustrative integrated circuit 10 in accordance with an embodiment of the present invention. Integrated circuit 10 has input-output (IO) circuitry 12 for driving signals off of integrated circuit 10 and for receiving signals from other circuits or devices via IO pins 14. Interconnection resources 16 such as global and local vertical and horizontal conductive lines and busses may be used to route signals on integrated circuit 10. Interconnection resources 16 include fixed interconnects (conductive lines) and programmable interconnects (e.g., programmable connections between respective fixed interconnects). The programmable interconnects associated with interconnection resources 16 may be considered to be a part of programmable logic regions 18.

Memory elements 20 may be formed using complementary metal-oxide-semiconductor (CMOS) integrated circuit technology (as an example). In the context of programmable logic device, memory elements 20 may store configuration data and are therefore sometimes referred to as configuration random-access memory (CRAM) cells. In general, configuration random-access memory elements 20 may be arranged in an array pattern. In a programmable logic device, there may be millions of memory elements 20 on a single device. A user (e.g., a logic designer) may provide configuration data for the array of memory elements during programming operation. Once loaded with configuration data, memory elements 20 may selectively control (e.g., turn on and off) portions of the circuitry in programmable logic regions 18 and thereby customize its functions as desired.

The circuitry of integrated circuit 10 may be organized using any suitable architecture. For example, programmable logic regions 18 may be organized in a series of rows and columns of larger programmable logic regions each of which contains multiple smaller regions. The larger regions are sometimes referred to as logic array blocks. The smaller logic regions are sometimes referred to as logic elements. A typical logic element may contain a look-up table, registers, and programmable multiplexers. If desired, programmable logic regions 18 may be arranged in more levels or layers in which multiple large regions are interconnected to form still larger portions of logic.

Horizontal and vertical conductors and associated control circuitry (not shown) may be used to access memory elements 20 when memory elements 20 are arranged in an array. The control circuitry, for example, may be used to clear all or some of the memory elements. The control circuitry may also write data to memory elements 20 and may read data from memory elements 20. Memory elements 20 may be loaded with configuration data, for instance, in CRAM arrays. The loaded configuration data may then be read out from the memory array to confirm proper data capture before integrated circuit 10 is used during normal operation in a system.

Generally, the control circuitry (or controller) may include one or more intellectual property (IP) cores (may also referred to IP elements), which may be hardwired inside the control circuitry. An IP core is a representative of a block or logical group of circuitry that typically performs one or more targeted functions. The IP core can be either "hard" or "soft," where a hard IP core is in a physical form and a soft IP core is in a logical form (e.g., at a register transfer level (RTL)). Examples of such IP cores may include, for example, an error detection cyclic redundancy check (EDCRC) engine, a decryption engine, a decompression engine, or other control circuitry. It should be appreciated that the above-mentioned IP cores may also sometimes be referred to herein as "controller-based IP cores."

In scenarios where some or all of the controller-based IP cores are not in used or required, each of the controller-based IP cores can be disabled from operating in the control circuitry. However, the unused controller-based IP cores may still occupy chip area in the control circuitry. For example, when an EDCRC engine, decryption engine, and decompression engine IP cores are formed and are not in used during device initialization, these controller-based IP cores may be disabled from operation. However, due to the hard-wired nature of these controller-based IP cores in the control circuitry, these controller-based IP cores will still occupy chip area in the control circuitry. For example, the decryption engine IP core may occupy up to 41 percent of the entire control circuitry area. This may result in excessive chip area being used by the control circuitry, which subsequently leads to higher fabrication cost.

If desired, a flexible IP migration mechanism may be performed to allow the unused controller-based IP cores from the control circuitry to be formed as part of a core logic circuit of integrated circuit 10 instead of as a hardwired portion of the control circuitry. In this way, the area occupied by the control circuitry in integrated circuit 10 can be reduced, subsequently increasing cost-savings for fabrication of the integrated circuit. The flexible IP migration mechanism, which is described in detail below, takes in a selection of the unused controller-based IP cores from a user and generates a dedicated IP configuration data stream file (sometimes referred to as "IP construction data" herein) for the selected controller-based IP cores. The IP construction data is subsequently used during a device initialization phase of integrated circuit 10 to construct or configure the selected controller-based IP cores as soft IP cores in the core logic circuit of integrated circuit 10.

Figure 2:
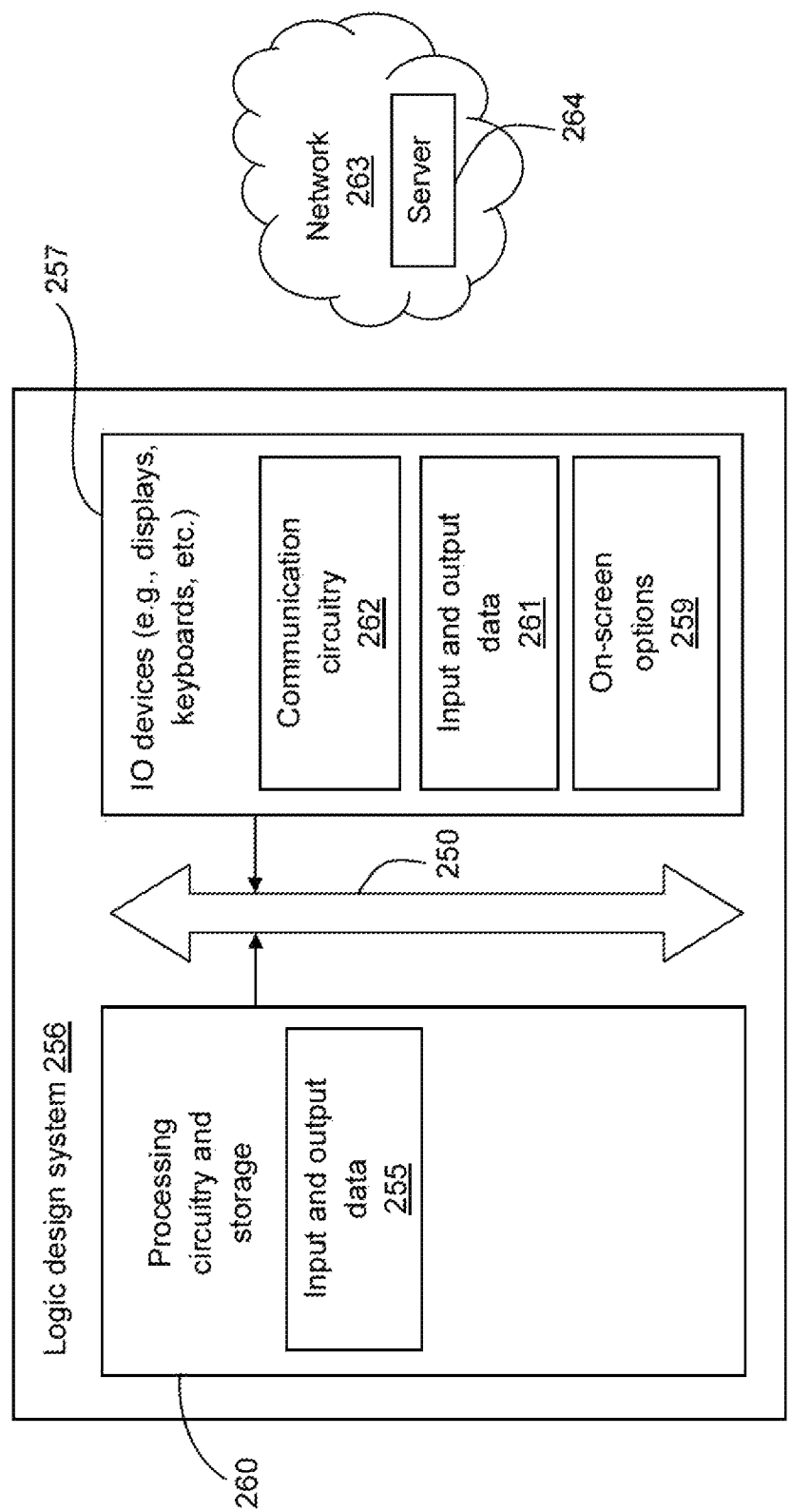
FIG. 2 is a block diagram of an illustrative logic design system that may be used to implement computer-based software tools in accordance with an embodiment of the present invention.

In an exemplary design flow, a circuit designer may use electronic design automation (EDA) tools to create a circuit design, and the EDA tools generate configuration data (e.g., configuration bit streams) that can then be used to configure an integrated circuit (e.g., integrated circuit 10 of FIG. 1). FIG. 2 is an illustrative logic design system that can be used for this purpose. As shown in FIG. 2, logic design system 256 may include processing circuitry and storage 260. Logic design system 256 may be based on one or more processors such as personal computers, workstations, etc. Processing circuitry and storage 260 may include circuitry for performing various supported instructions. Storage in circuitry 260 may be organized to form shared and stand-alone databases. The stored information in the storage of circuitry 260 may include input and output data 255. For example, input data may include settings selected by a user or a software library. Output data may include modeling results, configuration data, reports, or any other suitable processed output from logic design system 256.

In supporting design operations involved in implementing a desired custom logic function, logic design system 256 may use software that runs on processing circuitry and storage 260. This software may take the form of one or more programs. For example, the software is an EDA tool. When the programs are running on logic design system 256, logic design system 256 is sometimes referred to as a computer-aided design tool (or tools).

Input and output devices 257 may include input devices such as pointing devices and keyboards and may include output devices such as printers and displays. As shown in FIG. 2, logic design system 256 may display on-screen options 259 on a display. The user may click on these on-screen options or may otherwise make selections based on the displayed information. The user may also provide input by typing into text boxes, by performing drag and drop operations, using tabs, etc. Input and output data 61 may include input data (e.g., data that a user has typed into a text-box or has selected using a drop-down menu or other selectable options) and output data (e.g., modeling results, reports, information indicative of design choices, etc.). Input and output data 261 may be displayed on a display or printed for a user.

Communication circuitry 262 may facilitate data and information exchange between various circuits of logic design system 256 through bus interface circuitry 250. As an example, communication circuitry 262 may provide various protocol functionality (e.g., Transmission Control Protocol/Internet Protocol (TCP/IP) (including the physical layer, or PHY), User Datagram Protocol (UDP) etc.), as desired. As another example, communication circuitry 262 may communicate with network 263 (e.g., Ethernet, token ring, etc.). Network 263 may include one or more servers 264 that store data and information. During integrated circuit testing, communication circuitry 262 may be configured to store performance results of each tested integrated circuit on server 264. If desired, communication circuitry 262 may be used to send and receive data such as the performance results from server 264 over network 263.

Figure 3:
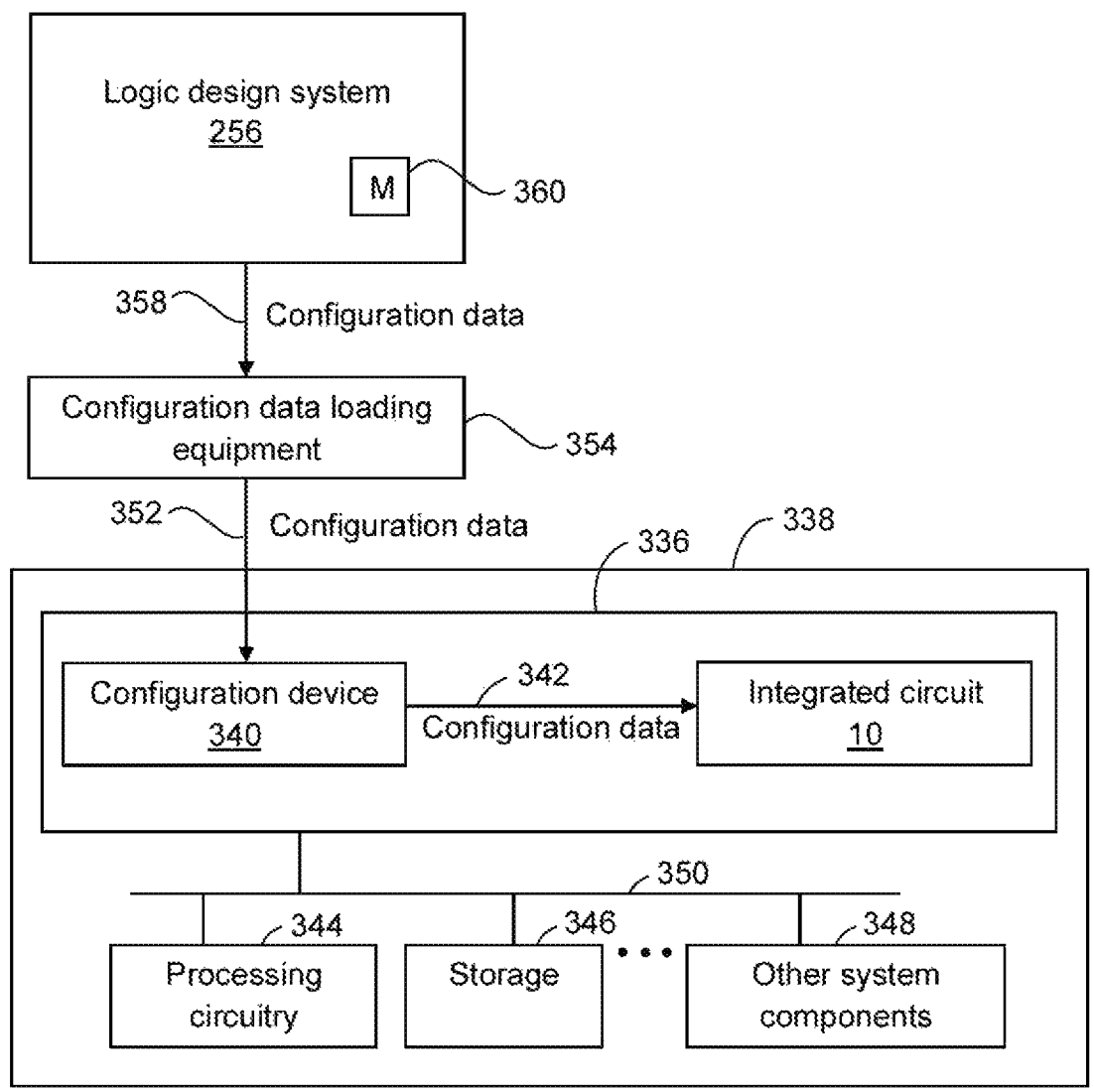
FIG. 3 is a diagram of an illustrative system environment in which an integrated circuit is configured using a logic design system in accordance with an embodiment of the present invention.

FIG. 3 is a diagram of an illustrative system environment in which an integrated circuit is configured using a logic design system in accordance with an embodiment of the present invention. It should be appreciated that for the sake of brevity, components already shown (e.g., integrated circuit 10 of FIG. 1 and logic design system 256 of FIG. 2) and described above will not be repeated. Integrated circuit 10 may be mounted on circuit board 336 in system 338. Integrated circuit 10 may receive configuration data from programming equipment or from any other suitable equipment or device.

In the example of FIG. 3, integrated circuit 10 is a type of programmable integrated circuit that receives configuration data from an associated programming device such as configuration device 340. With this type of arrangement, configuration device 340 may, if desired, be mounted on the same circuit board 336 as integrated circuit 10. Configuration device 340 may be a programmable logic device configuration data loading chip that loads configuration data into programmable logic device memory from a programmable logic device configuration data loading chip with built-in memory (sometimes referred to as a configuration device), an external electrically erasable-programmable read-only memory (EEPROM) chip, or any other suitable device. When system 338 boots up (or at another suitable time), the configuration data may be supplied to integrated circuit 10 from configuration device 340, as shown schematically by path 342. The configuration data that is supplied to integrated circuit 10 may be stored in programmable memory elements (e.g., memory elements 20 of FIG. 1) that are included in integrated circuit 10.

System 338 may include processing circuitry 344, storage 346, and other system components 348 that communicate with integrated circuit 10. The components of system 338 may be mounted on circuit board 336 or other suitable mounting structures or housings and may be interconnected by busses and other electrical paths 350.

Configuration device 340 may be supplied with the configuration data for integrated circuit 10 over a path such as path 352. Configuration device 340 may, for example, receive the configuration data from configuration data loading equipment 354 or other suitable equipment. Configuration device 340 may be loaded with data before or after installation on circuit board 336.

It can be a significant undertaking to design and implement a desired logic circuit in a programmable logic device. Logic designers therefore generally use logic design systems based on computer-aided-design (CAD) tools to assist in designing circuits. A logic design system (sometimes referred to as a circuit design system) can help a logic designer design and test complex circuits for a system. When a design is complete, the logic design system may be used to generate configuration data for electrically programming the appropriate programmable logic device. The logic design system may be implemented on computing equipment.

As shown in FIG. 3, the configuration data produced by a logic design system 256 may be provided to configuration data loading equipment 354 over a path such as path 358. Configuration data loading equipment 354 provides the configuration data to configuration device 340 so that configuration device 340 can later provide this configuration data to integrated circuit 10 over path 342. Logic design system 256 may be based on one or more computers and one or more software programs.

During operation of logic design system 256, executable software such as the software of the computer-aided design tools runs on the processor(s) of logic design system 256. Databases and other storage may be used to store data for the operation of logic design system 256. In general, software and data may be stored on any computer-readable medium (storage) in logic design system 256 such as storage 360. Such storage, which is shown schematically as storage 254 of FIG. 2, may include computer memory chips, removable and fixed media such as hard disk drives, flash memory, compact discs (CDs), digital versatile discs (DVDs), other optical media, and floppy diskettes, tapes, or any other suitable memory or storage device(s). When the software of logic design system 256 is installed, storage 360 of logic design system 256 has instructions and data that cause the computing equipment in logic design system 256 to execute various methods (processes). When performing these processes, the computing equipment is configured to implement the functions of the circuit design system.

Figure 4:
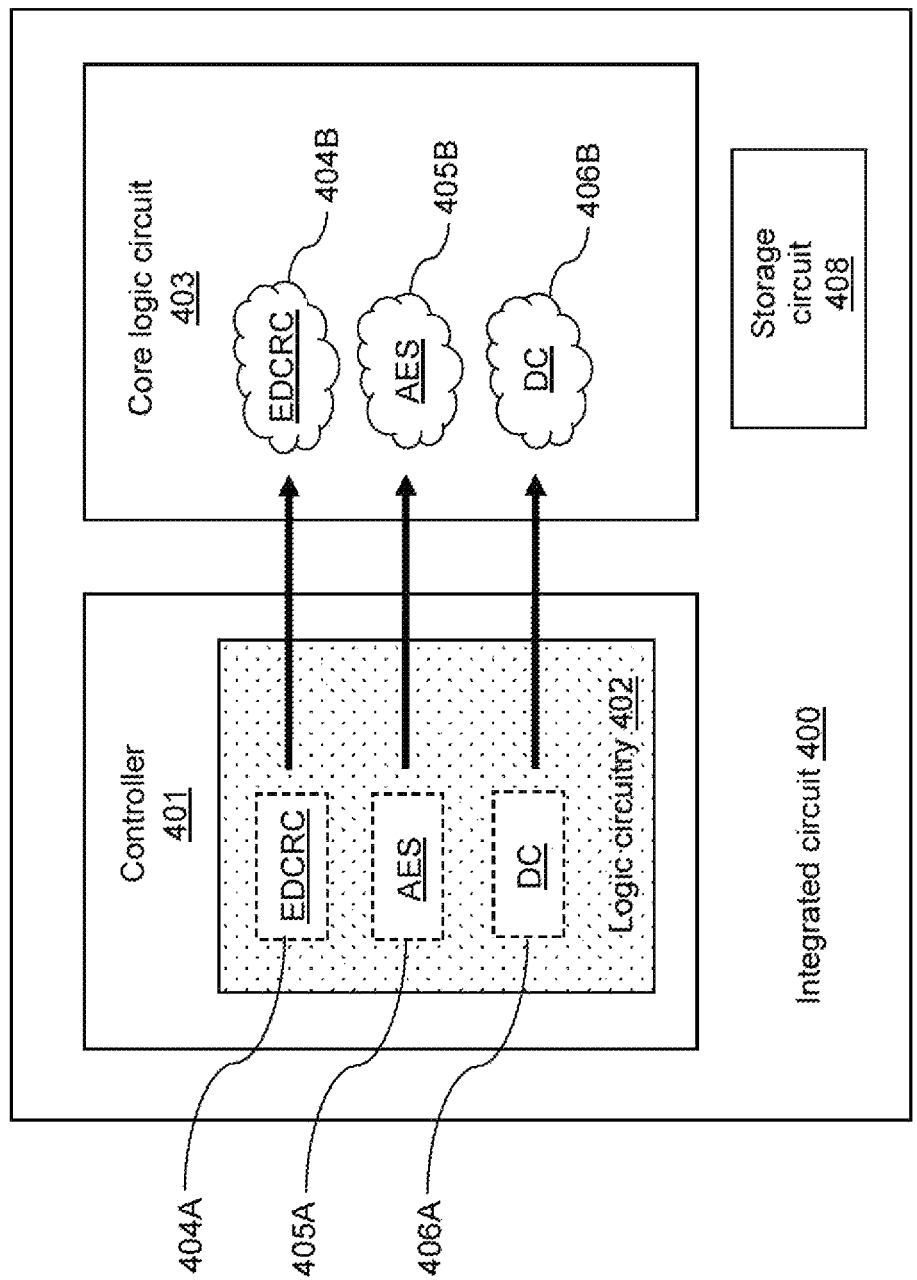
FIG. 4 shows an illustrative integrated circuit device having reduced control block size in accordance with an embodiment of the present invention.

FIG. 4 shows illustrative integrated circuit (IC) device 400 in accordance with an embodiment of the present invention. IC device 400 may be a programmable logic device integrated circuit (e.g., device 10 of FIG. 1), digital signal processor, an application-specific integrated circuit, a microprocessor, or any other suitable integrated circuit. As shown in FIG. 4, IC device 400 includes a controller 401 (sometimes referred to as a "control circuit" or "control circuitry"), core logic circuit 403 (sometimes referred to as a "core region" or "core fabric"), and storage circuitry 408. Controller 401 may be separated from core logic circuit 403.

In fabricating a typical IC device, one or more supporting functional elements (also referred to as intellectual property (IP) cores herein) may be formed, along with logic circuitry that contains other configuration logics, in the controller of the IC device during manufacturing. It should be noted that the above-mentioned IP cores may sometimes be referred to as "controller-based IP cores" herein. For example, the controller-based IP cores may include, an error detection cyclic redundancy check engine (herein referred to as EDCRC engine), a decryption engine (herein referred to as AES engine), a decompression engine (herein referred to as DC engine), or any other components that may be suitable for use in the present invention. If desired, controller 401 may include only one of engines EDCRC, AES, and DC, two of engines EDRC, AES, and DC, or each of engines EDRC, AES, and DC. Alternatively, controller 401 may have more than one of each type of engines EDRC, AES, and/or DC.

The controller-based IP cores are typically built and hardwired in the controller of the IC device. This means that they occupy a significant amount of space in the controller even when any or all of these IP cores are not in use such as during device initialization. To solve this problem, these unused controller-based IP cores may be removed from controller 401. The removal of these IP cores reduces the size of controller 401, which subsequently increases cost-savings for the integrated circuit fabrication. In the example shown in FIG. 4, controller-based IP cores 404A, 405A, and 406A, are represented using dotted lines to illustrate that they are not present (e.g., hardwired) in controller 401 due to the above-described scenario. In this scenario, the footprint (e.g., area) of controller 401 may be reduced, which subsequently increases cost-savings for the IC fabrication.

In the case when any or all of the removed IP cores 404A, 405A, and 406A are being used during normal operation (e.g., during user mode) of the IC device, the removed IP cores 404A, 405A, and 406A will be supplemented into IC device 400 as soft IP cores in the core region (e.g., core logic circuit 403) of IC device 400. To do so, a user may define a selection of controller-based IP cores (e.g., IP cores 404A, 405A, and 406A) to be enabled for operation in core logic circuit 403 (e.g., during a design phase of IC device 400). The selection is stored in a user design (e.g., custom logic design data). Prior to the selection, the requirements of controller 401 in the user design is analyzed using an electronic design automation (EDA) tool (e.g., logic design system 256 of FIG. 2) to identify the IP cores associated with controller 401. Subsequently, the user design is compiled (e.g., using the EDA tool) to generate full configuration data. As used herein, "full configuration data" or "full-chip configuration data" refers to data that is used to configure and setup IC device 400.

In one embodiment, the EDA tool may generate IP construction data based on the selection of the identified controller-based IP cores (e.g., IP cores 404A, 405A, and 406A). In one embodiment, the IP construction data is a dedicated IP configuration data stream file that implements logical operations of each of the selected controller-based IP cores as a soft IP core in the core region (e.g., core logic circuit 403 of FIG. 4) of IC device 400. For example, IP cores 404A, 405A, and 406A may be implemented as soft IP cores (e.g., IP cores 404B, 405B, and 406B), respectively, in core logic circuit 403. In one embodiment, the full configuration data may include the IP construction data.

In general, IC device 400 is loaded with initialization data such as boot code and configuration data for IC device 400. In one embodiment, the initialization data may include a flag signal (sometimes referred to as a "flag bit", "enable signal", or "control signal") that is indicative of an IP construction operation in core logic circuit 403. The flag signal may be generated along with the IP construction data. In one embodiment, the indicator flag enables the IP configuration data to be configured in the core region of the IC device during an initial configuration operation of the IC device. As shown in FIG. 4, the initialization data may be stored in storage circuit 408. For example, storage circuit 408 may be a register, a flash memory, or a cache memory in IC device 400. It should be appreciated that even though an internal storage element (e.g., storage circuit 408) is shown in the embodiment of FIG. 4, an external storage element may be used to store the initialization data.

During device power-up, an initialization phase is executed prior to a configuration of IC device 400. In this phase, controller 401 may receive IP construction data (through configuration device 340 of FIG. 3) that may be used to implement either one or all of the controller-based IP cores. Based on the example described above, assume that the received IP construction data is meant to implement controller-based IP cores 404A, 405A, and 406A as soft IP cores 404B, 405B, and 406B, respectively, in core logic circuit 403. When the flag signal (not shown) is enabled or activated (e.g., set to logic "1"), controller 401 may configure IC device 400 to perform the IP construction operation using the received IP construction data. In this scenario, controller 401 may perform a checking on the IP construction data to identify instruction sets that contain the logical operations of the selected IP cores 404A, 405A, and 406A. In one embodiment, each identified instruction set may be configured to construct a corresponding soft IP core (e.g., IP cores 404B, 405B, and 406B) for each IP core.

In scenarios when any or all of the constructed soft IP cores 404B, 405B, and 406B are no longer in use in core logic circuit 403 during user mode, the soft IP cores may be removed. This may free up allocated core logic resources (e.g., approximately 2 percent of total available core logic resources) for IP construction operation, which can be reused or utilized for other purposes during partial reconfiguration operations.

Figure 5:
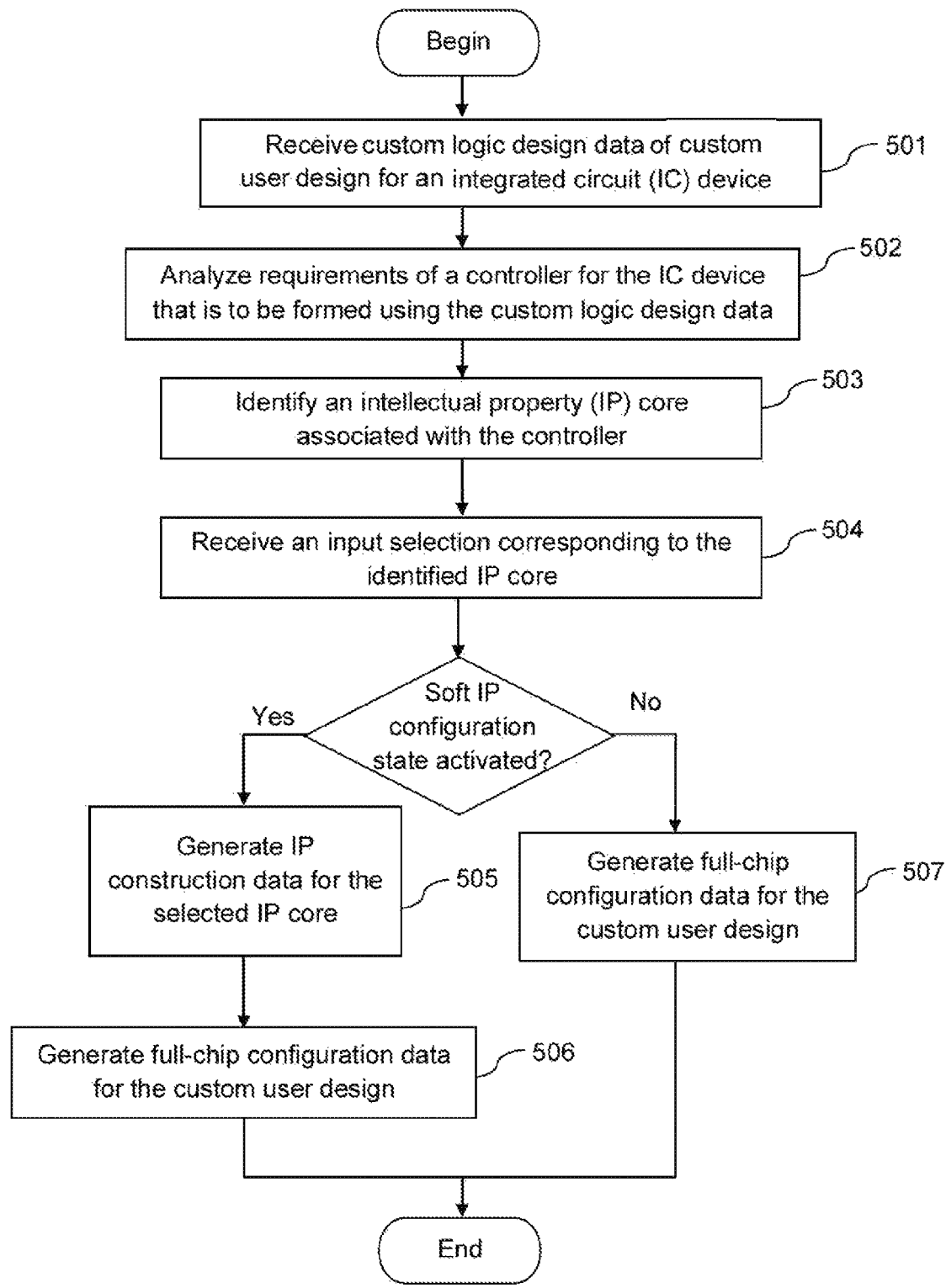
FIG. 5 shows illustrative steps for compiling a custom user design for an integrated circuit device in accordance with one embodiment of the present invention.

FIG. 5 shows a flow chart of illustrative steps for compiling a custom user design for an integrated circuit (IC) device (e.g., IC device 400 of FIG. 4) in accordance with one embodiment of the present invention. In one embodiment, the steps shown in FIG. 5 may be performed by an electronic design automation (EDA) tool (e.g., logic design system 256 of FIG. 2) during compilation of a circuit or user design. At step 501, the EDA tool may receive custom logic design data (e.g., a custom user design) for an IC device. Accordingly, the EDA tool may analyze requirements of a controller of the IC device that is to be formed using the custom logic design data at step 502. Based on the analysis, an intellectual property (IP) core associated with the controller (or controller-based IP core) is identified at step 503.

At step 504, an input selection corresponding to the identified IP core is received. The input selection may be provided by a user (e.g., logic designer) using the EDA tool. In one embodiment, the input selection activates a soft IP configuration state of the controller-based IP core for the custom logic design data. For example, as shown in FIG. 4, the controller-based IP core may include IP cores 404A, 405A, and 406A. In an exemplary embodiment, IP cores 404A, 405A, and 406A may not be used or required during an initialization operation of the IC. Therefore, these IP cores can be "migrated" out of controller 401 and into core logic circuit 403 of IC device 400. That is, these IP cores are not hardwired into controller 401, but rather are moved to locations within core logic circuit 403 and implemented as soft IP cores. In this scenario, the area size of controller 401 can be reduced relative to scenarios where the IP cores are hardwired on the controller, which subsequently increases cost-savings for the IC fabrication.

In response to the activation of the soft IP configuration state, the EDA tool may generate IP construction data based on the selection at step 505. In one embodiment, the IP construction data is a dedicated soft IP configuration data stream file that corresponds to the selection of the at least one controller-based IP core. The IP construction data may implement logical operations of the controller-based IP core (e.g., IP cores 404A, 405A, and 406A of FIG. 4) as a soft IP core (e.g., soft IP cores 404B, 405B, and 406B of FIG. 4) in the core region (e.g., core logic circuit 403 of FIG. 4) of the IC device. It should be noted that in one embodiment, whenever modifications are made to the user design (e.g., by adding or removing the controller-based IP core from the input selection), the modified user design may need to be recompiled and updated IP construction data will be generated.

Additionally, the EDA tool may also generate full-chip configuration data for the custom user design at step 506. In the case where the controller-based IP core is not in used or required during normal operation (i.e., the identified IP core is not selected in the input selection), the EDA tool may generate full-chip configuration data without IP configuration data for the custom user design at step 507.

Figure 6:
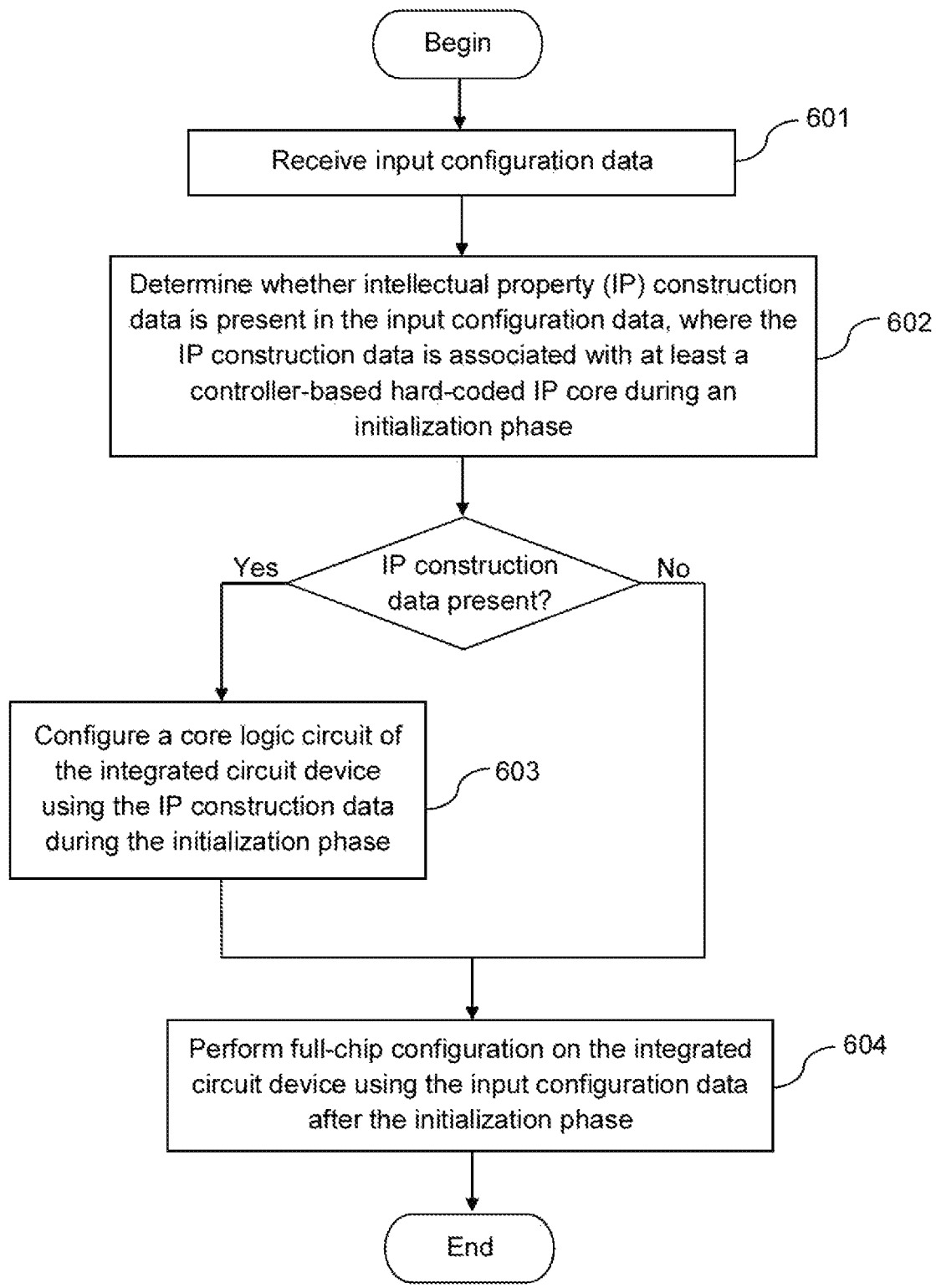
FIG. 6 shows illustrative steps for initializing and configuring an integrated circuit device in accordance with one embodiment of the present invention.

FIG. 6 shows illustrative steps for initializing and configuring an integrated circuit (IC) device in accordance with one embodiment of the present invention. In one embodiment, the steps shown in FIG. 6 may be performed by an electronic design automation (EDA) tool (e.g., logic design system 256 of FIG. 2) during configuration of the IC device (e.g., IC device 400 of FIG. 4).

At step 601, input configuration data is received. In one embodiment, the input configuration data may include full-chip configuration data for the IC device. As part of a device initialization phase, it is determined whether intellectual property (IP) construction data is present (along with the full-chip configuration data) in the input configuration data at step 602. If the IP construction data is present, a core logic circuit of the IC device is configured using the IP construction data at step 603. In one embodiment, the IP construction data is a dedicated soft IP configuration data stream file that implements the logical operations of at least one controller-based IP core (e.g., IP cores 404A, 405A, and 406A of FIG. 4) as a soft IP core (e.g., soft IP cores 404B, 405B, and 4-6B) in a core region (e.g., core logic circuit 403 of FIG. 4) of the IC device. The IP configuration data may identify a location in the core region of the IC device at which the IC device is to be configured using the controller-based hard-coded IP core.

At step 604, full-chip configuration is performed on the IC device using the input configuration data after the initialization phase. The input configuration data, which may include the full-chip configuration data, may be used to configure the functionality of the components (e.g., memory elements 20 of FIG. 1, interconnection resources 16 of FIG. 1) of the IC device.

The method and apparatus described herein may be incorporated into any suitable circuit. For example, the method and apparatus may be incorporated into numerous types of devices such as microprocessors or other integrated circuits. Exemplary integrated circuits include programmable array logic (PAL), programmable logic arrays (PLAs), field programmable logic arrays (FPGAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; IO circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention.

What is claimed is:

1. A method of using a logic design system to generate configuration data for an integrated circuit (IC) device, the method comprising:
   receiving custom logic design data for the IC device;
   analyzing requirements of a controller for the IC device that is to be formed using the custom logic design data;
   identifying an intellectual property (IP) core associated with the controller;
   receiving an input selection corresponding to the identified IP core, wherein the input selection activates a soft IP configuration state for the IP core; and
   in response to an activation of the soft IP configuration state, generating the configuration data for the IC device, wherein the generated configuration data includes soft IP configuration data for the IP core, and wherein the soft IP configuration data configures an associated soft IP core in a core region of the IC device to implement logic functions of the IP core.

2. The method defined in claim 1, wherein generating the configuration data comprises generating a flag signal for the soft IP configuration data, wherein the flag signal enables the soft IP configuration data to be configured in the core region of the IC device during an initial configuration operation of the IC device.

3. The method defined in claim 2, further comprising:
   identifying an additional IP core associated with the controller.

4. The method defined in claim 3, further comprising:
   receiving an additional input selection corresponding to the additional IP core, wherein the additional input selection activates an additional soft IP configuration state for the additional IP core.

5. The method defined in claim 4, further comprising:
   in response to a determination on the additional input selection, generating updated configuration data for the IC device, wherein the updated configuration data includes additional soft IP configuration data, and wherein the additional soft IP configuration data configures an additional soft IP core in the core region of the IC device to implement additional logic functions of the additional soft IP core.

6. A method for using a logic design system to configure an integrated circuit (IC) device having a core region and a control region using custom logic design data during device power-up, the method comprising:
- with the logic design system, identifying that the custom logic design data includes a controller-based intellectual property (IP) element for the core region of the IC device; and
- with the logic design system, generating configuration data for the IC device using the controller-based IP element and the custom logic design data, wherein the generated configuration data identifies a location in the core region of the IC device at which the IC device is to be configured using the controller-based IP element.

7. The method defined in claim 6, further comprising:
- with the logic design system, receiving the custom logic design data from a user of the logic design system.

8. The method defined in claim 7, wherein the logic design system comprises a display, the method further comprising:
- with the logic design system, displaying an on-screen opportunity using the display for the user to enable a soft IP configuration state of the controller-based IP element for the custom logic design data.

9. The method defined in claim 8, wherein generating the configuration data for the IC device further comprises:
- with the logic design system, generating soft IP configuration data that corresponds to the controller-based IP element for a core logic circuit in the core region of the IC device.

10. The method defined in claim 9, wherein generating the soft IP configuration data comprises storing the soft IP configuration state of the controller-based IP element in the soft IP configuration data.

11. The method defined in claim 9, further comprising:
- with a storage circuit, storing the soft IP configuration data.

12. The method defined in claim 11, further comprising:
- with the storage circuit, storing an enable flag to enable the soft IP configuration data to be configured within the core logic circuit in the core region of the IC device during an initial configuration operation of the IC device.

13. The method defined in claim 8, further comprising:
- with the logic design system, monitoring the soft IP configuration state for changes with respect to the controller-based IP element in the custom logic design data.

14. The method defined in claim 13, further comprising:
- with the logic design system, generating updated configuration data based on changes in the soft IP configuration state associated with the controller-based IP element.

15. The method defined in claim 14, further comprising:
- with the logic design system, generating updated configuration data for the IC device, wherein the updated configuration data comprises updated soft IP configuration data.

16. A method of configuring an integrated circuit (IC) device having a core logic circuit and a control circuit that is separate from the core logic circuit, the method comprising:
- at computing equipment, receiving configuration data;
- with the computing equipment, determining whether intellectual property (IP) construction data is defined in the configuration data, wherein the IP construction data is associated with at least a controller-based IP element for the control circuit of the IC device; and
- with the computing equipment, configuring the core logic circuit of the IC device using the controller-based IP element in response to determining that the IP construction data is defined in the configuration data.

17. The method defined in claim 16, further comprising: configuring the IC device using the configuration data.

18. The method defined in claim 16, wherein determining whether the IP construction data is defined in the configuration data comprises identifying an instruction set for implementing logical operations of the controller-based IP element in the core logic circuit of the IC device.

19. The method defined in claim 18, further comprising:
- implementing the instruction set as a soft IP element in the core logic circuit of the IC device.

20. The method defined in claim 19, wherein the IC device includes a storage circuit that communicates with the core logic circuit, and the method further comprises:
- storing a flag bit associated with the IP construction data in the storage circuit, wherein the flag bit indicates a construction of the soft IP element using the IP construction data in the core logic circuit of the IC device during an initial configuration operation of the IC device.

* * * * *